Oct. 23, 1962 E. R. BILLINGTON Re. 25,272

EXCESS FLOW VALVE

Original Filed Jan. 30, 1957 2 Sheets-Sheet 1

INVENTOR.
Evans R. Billington
BY
Watson D. Haubaugh
Atty.

EXCESS FLOW VALVE

Original Filed Jan. 30, 1957 2 Sheets-Sheet 2

INVENTOR.
Evans R. Billington
BY
Watson W. Harbaugh
Atty.

United States Patent Office

Re. 25,272
Reissued Oct. 23, 1962

25,272
EXCESS FLOW VALVE

Evans R. Billington, Chicago, Ill., assignor to The Bastian-Blessing Company, Chicago, Ill., a corporation of Illinois Original No. 2,909,188, dated Oct. 20, 1959, Ser. No. 637,119, Jan. 30, 1957. Application for reissue Jan. 12, 1962, Ser. No. 168,003
30 Claims. (Cl. 137—316)

Matter enclosed in heavy brackets [ ] appears in the original patent but forms no part of this reissue specification; matter printed in italics indicates the additions made by reissue.

This invention relates to an excess flow check valve for use in liquefied petroleum gas equipment, and more particularly to an excess flow check valve adapted for use in a liquid withdrawal outlet of a liquid eduction and for fill control fitting adapted to be secured upon a storage tank or container that receives sensible heat from the ground or atmosphere, so that vapor pressure in the storage tank can be employed for filling the fuel tank of a tractor or the like with liquefied petroleum in its liquid phase.

Excess flow check valves are normally used as automatic shut-off check valves in eduction lines of permanent installations dispensers of liquefied petroleum gas as a safety precaution to close in the direction of flow of gas through the line in event a break occurs in the line beyond the valve. These valves are generally located at the tank and although various types of flow check valves have been employed in the past with domestic installations of liquefied petroleum gas systems, they are subject to the objection that they are not satisfactory and it is difficult or impossible to prepare or adapt the liquid eduction outlet for use in filling the fuel tank of a tractor, or the like, without accidentally or otherwise spilling the gas in a dangerous and wasteful manner. For example, even though the excess flow check valve is subject to the pressure within the storage container from which liquid is to be withdrawn it is normally open, and as a coupling joint beyond it is being loosened to make a connection the bleed at the joint occurring during loosening permits the space beyond the excess flow check valve to be filled with liquid. This liquid flies in all directions when the joint members separate and more liquid is ejected before the liquid flow closes the excess flow check valve. Then too, there is always the fact that the valve is cocked or slightly open when closing under such conditions thereby causing a pressure which hinders the making of a connection to the fuel tank to be filled.

Accordingly, it is an object of the present invention to provide an excess flow check valve having a particular construction which assures against any excess flow of gas while the coupling is being loosened and thereafter, being already closed prevents accidental flow of gas from the storage container in which the gas is stored while the new coupling is being made, yet will thereafter permit unobstructed normal high rate of flow of the gas during fuel tank filling operation.

Another object of the invention is to provide bleed passage means in the excess flow check valve having a high drop in pressures across it under potentially high flow conditions when the valve is closed, and a low drop in pressure across it for equalizing pressures when low flow conditions exist to permit full opening of the check valve in use. Said bleed means being closed off by a safety means prior to making of a conversion connection for use detachably between a storage tank and the fuel tank to be filled, such as a control valve at the outlet of the excess flow check valve.

Another object of the invention is to provide safety means for an excess flow check valve bleed passage, which closes the bleed passage until such can be opened under controlled conditions which do not permit danger to an operator or property.

Another object of the invention is to provide a positively closed excess flow check valve as described, wherein means are provided to prevent accidental angular dislodgement of the check valve during removal of the said safety means which holds the valve closed, said means preventing in one of the embodiments shown, the accidental or free angular rotation that would offer no opposition to the loosening of the supporting screw, and thereafter, once the screw is removed, it may not be reused to hold the valve closed again.

Another object of the invention is to provide an excess flow check valve as described which is biased against opening prior to the time a connection is made permanently with a control valve or other means that serves as the coupling member to govern the outflow of liquid gas to a tank to be filled, but which valve will open and remain normally open under operative conditions and pressures existing under normal filling operations from the storage tank and the fuel tank being filled.

A further object contemplates an arrangement where before removing the excess flow valve closing safety device, the valve can be tested with a momentary inward pressure on the safety device by an operator to see whether or not the valve is operative to open and shut under working conditions before a full head of liquid gas is disposed behind the valve.

Other objects and advantages of the invention will become apparent as the description proceeds in accordance with the drawings, in which.

Figure 1:
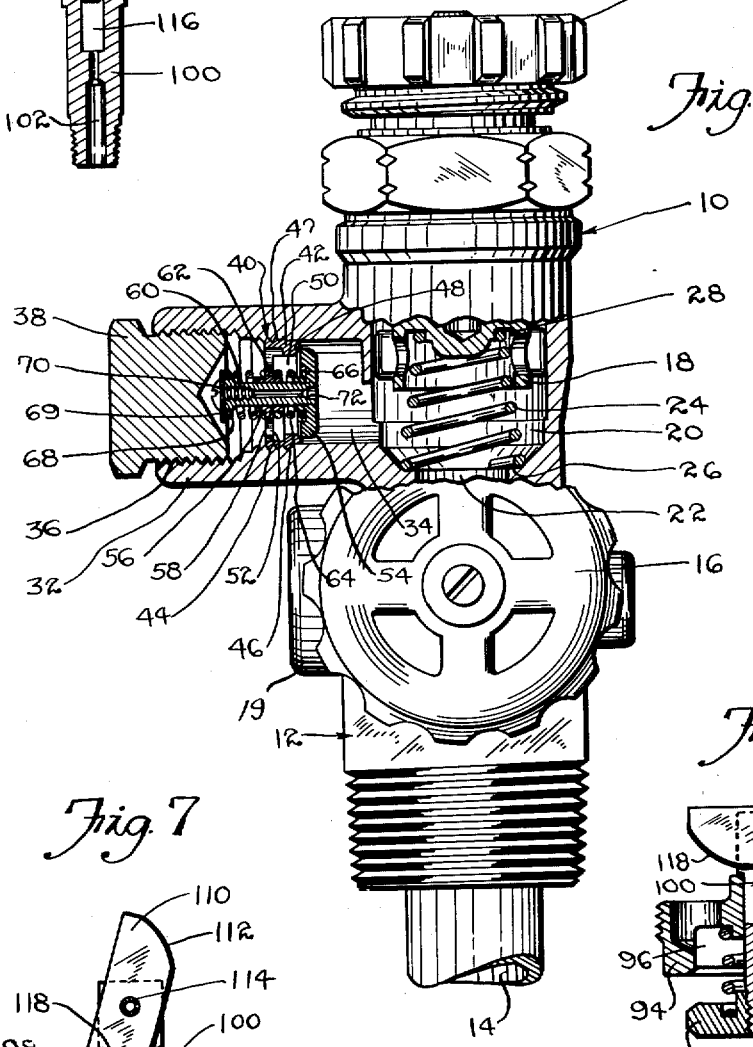
FIG. 1 is a side elevational view, partly in vertical section, showing the excess flow check valve of the invention in operative relationship with a liquid fill and eduction means.

Referring now to FIG. 1, a liquid fill and eduction control fitting 10 is shown which may be threadedly secured by means of a body section 12 upon a storage tank 84 [for] *before* it is filled with a charge of liquefied petroleum gas, same having a liquid fill and eduction pipe 14 secured thereon which extends to the bottom of the tank. This structure and other features of the fitting will be fully understood to those skilled in the art as per the Buttner et al. Patent No. 2,456,913, when it is appreciated that the female portion of a P.O.L. connection is formed in the boss 19 for eduction to domestic appliances under the control of a hand shut-off valve having a handle 16. This valve affords selective opening and closing of the liquid eduction service conduit supplied from the tank through the dip pipe 14. The dip pipe 14 as also already inferred, is usable for filling the tank with gas injected through the fill control means 18. The pipe 14 is preferably constructed to embody spray filling such as shown in the application of Poethig and Billington, Serial No. 527,522, filed August 10, 1955, now Patent No. 2,813,402 on Method and Apparatus for Liquid Filling of Pressure Storage Tanks.

The control means 10 includes a valve 18 biased to close a chamber 20 leading to the pipe 14 through a bore 22 by means of a helical spring 24 seated on a shoulder 26 at its lower end, and bearing against the valve 18 at its upper end within a recess 28. Thus, when a cap 30 of the control means for threadedly closing the upper end of a bore (not shown) leading to the compartment 20, is removed and a conduit secured to permit flow of liquid against the valve 18, the spring 24 will be compressed to permit filling of the tank (not shown) to which the fitting 10 is secured, see Norway No. 2,361,866.

In order to permit filling of a tractor or other device, an outlet housing, body member or boss 32 is formed integrally with the body 12 defining therein a conduit passageway or bore 34 opening into the compartment 20. The bore 34 is threaded at 36 to receive a closure or plug 38 which may be removed when it is desired to secure a control valve or conduit coupling in the fitting 32 for filling the tank of a device such as a tractor directly from the storage tank as described.

When the storage tank has been filled, the sensible heat from the ground or atmosphere, as described in the U.S. Patent No. 2,405,998 by W. C. Buttner, et al., will develop a working pressure in the top of the tank such as will tend to force liquid from the storage tank upwardly through the liquid fill and eduction pipe 14 and out through the boss 19 if the valve 16 is open to a service conduit as already mentioned. This would tend to fill the cavities 20 and 34 with liquid gas under tank pressures. However, under low domestic use conditions the withdrawal of gas through the service conduit can be supplied with gas vaporized in the eduction pipe 14 with latent heat from the tanks. Thus, the cavities 20 and 34 are generally filled with vapor or liquid until this space is vented to atmosphere or a fuel tank at the boss 32.

There are many types of coupling connections in the field on tractors and other portable devices which use liquified petroleum gas to an advantage as a fuel and in order to supply this use taper threaded boss 32 supplied with an excess flow check valve is provided to which one of the coupling members of all types (not shown) can be permanently secured.

Accordingly, an excess flow check valve 40 is provided within the outlet conduit or valve retainer boss 32 by threading a spider member or retainer element 42 in the bore 34 by means of internal threading 44 therein so that the shoulder 46 in the bore snugly abuts the inner end of the threading 47 on the retainer.

The retainer 42 defines a valve seat 48 at its inner end, and an axial recess or conduit portion 50 communicating with the passage or bore 34 at both its inner and outer ends by means of a plurality of bores or apertures 52 extending axially therethrough. A valve 54 is provided which is normally open being urged or biased away from the valve seat 48 by a resilient means such as the spring 64 when it is free to do so. The valve member 54 is staked or otherwise secured to a valve stem 60 as at 49 (FIG. 7) and the stem in turn is slidably mounted in a collar or guide 56 (FIG. 1) carried by the retainer 42 and formed integrally therewith so as to define a central bore 58 for receiving a valve stem 60 in guided relationship.

The retainer 42 defines an abutment or annular flange 62, and in order to bias the valve 54 outwardly or away from the guide 56 as already mentioned, the spring 64 is a helical spring working under compression between the flange 62 at one end and against the valve 54 at its other end within a recess 66 in the adjacent face thereof.

It will be appreciated that with the valve 54 open and the plug 38 being unscrewed, vapor or liquid under pressure in cavities 20 and 34 will escape and permit them to be filled with liquid all the way to the plug being loosened. Thereafter when free of the threads the plug blows outwardly and liquid gas flies in every direction burning the hands of the operator and causing waste and a fire hazard.

In order to prevent this, safety means or retainer elements are provided including a helical spring 68 which bears against the flange 62 as an abutment at one end and against a washer 69 at its other end, which is held in position by a screw or other suitable retainer keeper or fastening means 70 threadedly received coaxially in the stem 60. The relative force or strength of the spring 68 is preferably greater than the strength of the spring 64 so that the valve 54 is held closed independently of tank pressures throughout the removal of plug 38. Then vapor alone is generally trapped immediately behind the valve.

Thus, when it is desired to use the outlet 32, the plug 38 is simply removed and the screw 70 taken off the stem 60 by means of the kerf therein, thereby placing the outlet in condition for connection with a suitable control valve or conduit. The pressure drop across the valve due to the tank pressure will normally suffice to keep the valve closed under these conditions and this procedure does not involve any great hazard, particularly since the actual operativeness of the valve may be tested if desired by momentarily depressing the stem 60 slightly, even while the spring 68 is still in position. It will be appreciated, however, that this testing will not ordinarily be employed, and the control valve or conduit will normally be connected immediately to the outlet.

It should be noted that a long bleed passage 72 is drilled through this stem 60. The size of this passageway is preferably a #60 drill size or less. It is large enough that quick equalization of pressures between a fuel tank and a storage tank will be effected, yet small enough and long enough that liquid gas in any dangerous quantities will not be discharged during conversion, yet large enough that the screw 70 cannot be reinserted against the escaping gas either unwittingly or to make of the excess flow check valve, a hand shut-off valve operation.

Under actual operating conditions, the pressure which will be found in the tank of the tractor or other device will often exceed the pressure in the storage tank where a certain amount of liquid remains in the tank of the device to be filled since the warmth of the circumambient air exceeds the warmth of the ground in which the storage tank is normally positioned. Under such conditions, other means (not shown) may be provided by which the fuel tank to be filled is cooled or pressure therein reduced, but in order to assure that the pressure on both sides of the valve 54 will otherwise be relatively equal so that the valve will remain in fully opened position, the bleed means is provided which includes the axial bore 72 in the stem 60 so that the valve is normally open once the screw 70 is removed and a control valve or conduit is permanently attached. Thereafter, if a user of the fuel tank drives away while it is still attached and breaks the filling line with a control valve open, the excess flow check valve will snap shut until such time as repairs have been made.

Also, if upon making the connection, the valve 54 should be closed by an excess pressure condition as described, the passage 72 is sufficiently narrow to permit balancing of the pressures on either side of the valve 54 to take place relatively expeditiously but without danger that an excessive rate of flow will occur.

Figure 4:
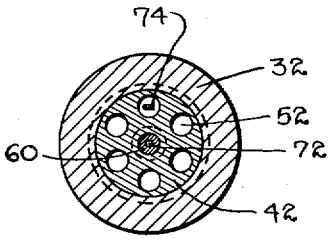
FIG. 4 is a vertical sectional view taken through the lines 4—4 of FIG. 2.
Figure 3:
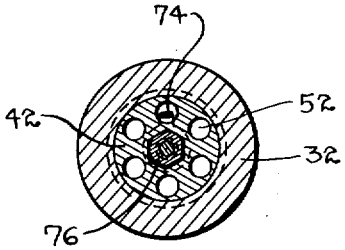
FIG. 3 is a vertical sectional view taken through the lines 3—3 of FIG. 2.
Figure 2:
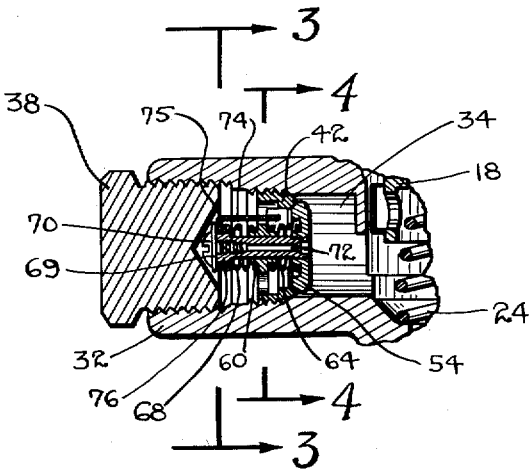
FIG. 2 is a vertical sectional view of the excess flow check valve of the invention, but representing another embodiment thereof.

Referring now to FIGS. 2 through 4, a second embodiment of the invention is shown, wherein lock means are also provided the safety means for preventing accidental rotation of the valve 54 while the screw 70 and its spring 68 are being removed. The means for preventing rotation of the check valve while the screw and spring are being removed comprises a washer having a wing or latching prong or lug 74 extending axially of the stem 60 in predetermined spaced parallel relationship thereto to enter any one of the plurality of axially formed ports or apertures 52 in the spider portion of the retainer 42. The end of the latch adjacent the head of screw 70 [being] *is* bent substantially at right angles at 75 and defines a circular aperture like a washer or the aperture may preferably be a hexagonal configuration or plate adapted to slip over and receive snugly therein a relatively widened portion 76 of the stem 70 of complementary configuration to prevent the latch 74 from rotating with respect to the stem 70 when it is positioned on the stem as shown. If the aperture is round it is preferred that lock washer-like serrations be provided which embed themselves in the end of the stem 70.

In this embodiment, the spring 68 abuts the right-angled portion 75 to hold it against the washer 69. Of course, in this embodiment the washer 69 may be eliminated, and in any case minor details of the construction may be varied in accordance with the understanding of those skilled in the art. The lock or latching prong 74 thus makes it possible to remove the screw 70 by the torque exerted thereon without rotating the stem 60, which would otherwise interfere with removal of the screw. Also, without such locking means, there would be a tendency to depress the screw and thereupon open the valve 54, with the undesirable consequences previously referred to. Thus, the locking element 74 constitutes an additional safety feature serving to maintain the valve 54 in a predetermined desirable seating position on the valve seat 48.

In assembling the valve check 40, the retainer 42 may be made up first as a unit, by inserting the stem 60 into the guide sleeve 56 of the retainer, mounting the spring 64 thereon by staking or threadedly securing the valve 54 in retaining position with respect to the spring at the lower end of the stem 60 and mounting the spring 68 at the other end of the stem 60 by slipping the flange extension 75 of the locking element 74 upon the hex element 76, securing the washer 69 and screw 70 thereagainst so as to close the bleed valve opening 72. In fitting the retainer assembly and check valve 40 into the outlet 32, it will be appreciated that the locking element 74 may be drawn outwardly by loosening the screw 70 so that it may be placed in any of the apertures 52, if this should be thought desirable in positioning the locking element for convenient access by the operator. The plug 38 may then also be threaded into position to serve as a further safety protection, which will substantially prevent leakage of propane vapor or gas, as well as maintain the valve stem 60 and valve 54 against accidental disturbance.

Figure 5:
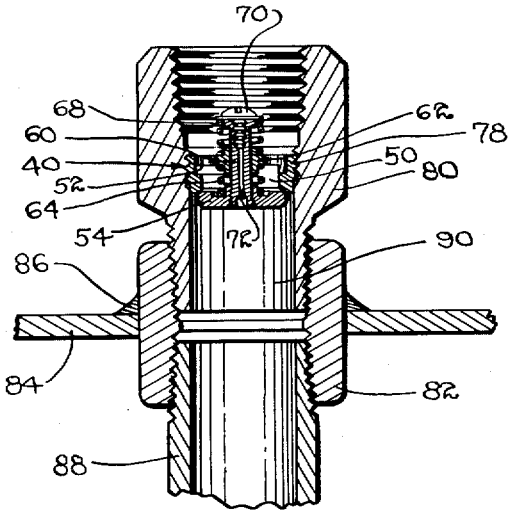
FIG. 5 is a vertical sectional view of yet another embodiment of the invention, corresponding to the embodiment of FIG. 1 but showing the excess check valve as used directly upon a storage tank secured directly thereto.

Referring now to FIG. 5, a third embodiment of the invention is seen wherein a separate valve assembly 78 is provided having spring valve and retainer elements constructed in accordance with the showing in FIG. 1, but permitting the liquid eduction pipe to be formed separately from the liquid fill pipe. Thus, a valve assembly retainer or sleeve 80 is provided having an axial dimension sufficient to receive the check valve assembly 40 therein, and to be threadedly received within a pipe coupling 82 secured in a tank 84 for storing liquefied petroleum as hereinbefore described. The pipe coupling 82 may be secured to the tank 84 by welding 86 or other suitable means, and extends for a predetermined distance on either side of the wall of the tank 84 so as to receive at its lower end a liquid eduction pipe 88 in threaded engagement therewith and in axial alignment with the bore 90 of the sleeve 80. This structure alone has the advantage that both filling and eduction can take place simultaneously with respect to the tank 84. Also, the embodiment of FIG. 5 is extremely economical to manufacture, since it involves the machining of relatively few parts, it being understood that the liquid fill pipe may be disposed elsewhere on the tank as long as it is in communication with the bottom of the tank.

Figure 8:
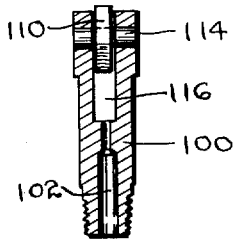
FIG. 8 is a fragmentary vertical sectional view of the latching means of the fourth embodiment.
Figure 7:
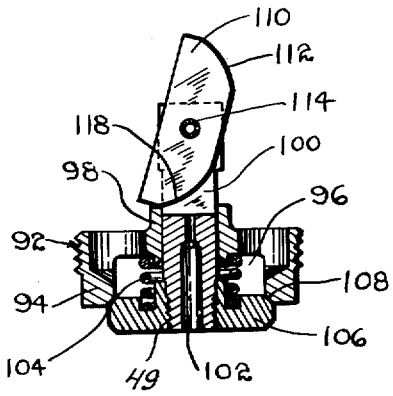
FIG. 7 is a side elevational view of the fourth embodiment showing the check valve in closed position.
Figure 6:
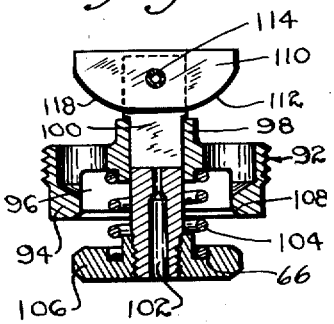
FIG. 6 is a side elevational view of a fourth embodiment of the invention, showing the check valve in open position.

Referring now to FIGS. 6 through 8, a fourth embodiment of the invention is seen wherein a retainer and check valve assembly 92 is provided corresponding to that of FIG. 1 in most respects, having a retainer 94 adapted to be received in an outlet pipe such as the outlet pipe 32 or 80, but forming a spider 96 carrying a cylindrical guide 98 whose upper end is relatively elongated with respect to the guide shown in FIG. 1 as hereinafter set forth. The valve stem 100 thereof defines a bleed passage 102, also as set forth with respect to the embodiment of FIG. 1, and is slidably received in the guide 98 so that it may be outwardly biased by a spring 104 bearing against the spider 96 at one end and against a valve 106 at the other end so that the valve is normally held outwardly of a valve seat 108 in the manner described with respect to the action of the spring 64. However, instead of the spring 68 for holding the valve 106 in closed position, the stem 100 is provided with a locking cam 110 having a cam surface 112 at both ends adapted to cooperate with the relatively elongated guide 98 to move the valve 106 into closed position, as shown in FIG. 7 when the locking member 110 is pivoted by means of a pin 114 in the stem 100 to move the locking cam 110 within an axial groove 116 in the stem. The relative distance from the pin 114 to the end of the locking cam 110 adjacent the cam surface 112 is such that with the locking element in the position in FIG. 7, it may be maintained without danger of jarring loose and without the necessity of manual control, although such control may be easily used in holding the valve 106 in a closed position for a predetermined interval and then releasing it by rotation of the locking element 110 in the opposite direction. The surface 112 is preferably arcuate for smooth engagement with the outer end of the guide 98, and it will be appreciated that the opposite end of the locking cam 110 (designated by numeral 118) may also be used for this purpose or may be calibrated to form an even tighter engagement with the guide 98 if desired. It is therefore unnecessary to loosen a screw such as the screw 70 in preparing the check valve 92 for operation, since all that is required is manually pivotal movement of the cam element 110 into the position shown in FIG. 7.

Although I have herein shown and described my invention with respect to certain principles and details thereof, it will be understood by those skilled in the art that these may be varied without departing from the spirit and scope of the invention as set forth in the hereunto appended claims.

I claim:

1. An excess flow check valve comprising a housing having a conduit portion terminating at one end in a valve seat, a spider adjacent said valve seat with a central portion having a longitudinal bore therethrough, a valve stem slidably received in said bore and having a bleed passage therethrough terminating in a threaded aperture, a valve disk member carried on said stem at the other end cooperating with the valve seat, resilient means between said valve disk member and spider for urging the valve disk member away from the valve seat, means adjacent the threaded end of the stem for limiting the distance of movement of said valve disk member in its opening direction, a screw received in said threaded aperture to close said bleed passage, and means interconnecting said spider and screw for holding said valve disk member closed.

2. An excess flow check valve comprising a housing having a conduit portion terminating at one end in a valve seat, a spider element adjacent said valve seat with a central portion having a longitudinal bore therethrough, a valve stem slidably received in said bore and having an adjustable cam means at one end of the stem, a valve disk member on said stem at the other end cooperating with the valve seat and having a bleed passage therethrough, resilient means between said valve disk member and spider for urging the valve disk member away from the valve seat, means on the stem adjacent to said cam means for limiting the distance of movement of said valve disk member in its opening direction, and means supported by said spider and engaging said cam means for holding said valve disk member closed.

3. The combination called for in claim 2 in which said cam means includes a helical thread on the stem and the last means includes a threaded element adjustably engaging said helical thread.

4. The combination called for in claim 3 in which said means supported by the spider is a compression spring of a strength greater than said resilient means.

5. The combination called for in claim 2 in which the last means comprises a latching element extending axially of the stem, and engaging in an opening in the spider to support said stem against rotation.

6. The combination called for in claim 2 in which said cam means includes means for sealing said bleed passage when said valve disk member is held closed.

7. The combination called for in claim 2 in which said cam means includes locking means pivotally secured on said valve stem at the end opposite said valve disk member adapted to be manually pivoted into position to cooperate with central portion of the spider element and maintain said valve disk member in closed position.

8. The combination called for in claim 2 in which said cam means includes means pivotally secured on said valve stem at the end opposite said valve disk member adapted to be manually pivoted into position to cooperate with said spider element and maintain said valve in closed position, said means having a cam surface at one end thereof adapted to cam said stem in valve-closing direction during said pivotal movement.

9. An excess flow check valve comprising a conduit defining a fluid flow passageway and having a valve seat therein, a supporting element having a bore therethrough on one side of the valve seat coaxial therewith and with the passageway therebeyond, a valve means including a valve stem slidably carried by said supporting element *and through said valve seat* and extending through said bore *on one side of said bore,* and a valve element attached to said stem on the stem portion extending beyond said supporting element on the valve seat side thereof, said valve stem extending beyond said supporting member on the other side thereof, spring means encircling said stem and interengaging said valve means and said supporting element and biasing said valve away from said valve seat, said valve means having a bleed passage through said valve means, means for holding said valve in closed position against the force of said biasing means and for releasing said biasing means selectively including relative adjustable elements one of which comprises the stem and another of which has a shoulder and is threaded for relative rotation with respect to said valve to engage and slide said stem in said bore in the direction closing the valve, and sealing said bleed passage when said valve is held closed thereby against said valve seat, means between said valve means and said supporting members limiting the distance said valve opens when said biasing means is released, said valve means and biasing means being carried solely by said supporting element.

10. The combination called for in claim 9 including an element between said shoulder and stem for holding the stem against rotation during rotation of said shouldered element.

11. A unitary valve construction to be received within a threaded opening of a conduit and comprising an integral body having an externally threaded peripheral portion defining a valve seat adjacent one end and an internally bored guide element having openings therethrough, a stem slidably mounted in said bore extending through said valve seat, a valve member on said stem adapted to close against said valve seat, means between said [body] *guide element* and the valve member for urging said valve member away from said valve seat, means on said stem engaging said body for limiting the distance of travel of the valve member away from said valve seat, and means for holding said valve member in closed position against the force of said biasing means including a movable member engaging said stem and a spacer between said movable member and said body released when said movable member is moved a predetermined distance.

12. The combination called for in claim 11 in which said spacer is a compression spring permitting said valve stem and valve member to be moved away from said closed position.

13. In an excess flow valve for use in a liquefied gas system, a body member defining a bore therethrough having an inlet end for communication with a source of liquefied gas under pressure and an outlet end for discharge flow, said body defining an abutment intermediate its ends, a valve stem axially slidably carried by said body within said bore and terminating at its one end in a poppet valve adapted to close the bore inlet end, biasing means urging said poppet valve toward an open flow position, said valve stem having a bore extending axially therethrough, and keeper means including a retainer means and a connector, said retainer means at one end axially engaging said abutment in supported relationship, said retainer means including at its other end spaced opposed portions slidably and non-rotatably engaging said valve stem, said connector serving to removably interconnect said retainer means and said valve stem and extending into said valve stem bore for closure thereof.

14. In an excess flow valve for use in a liquefied gas system, a body member defining a bore therethrough having an inlet end for communication with a source of liquefied gas under pressure and an outlet end for discharge flow, a valve seat in said body member facing away from said outlet end of the bore, valve means adapted to close against said valve seat including a stem and a poppet valve member carried thereby, means in said body *between said valve seat and outlet end* for supporting the stem in guided relationship, first spring means of predetermined strength disposed between said supporting means and the poppet valve member on one side of the supporting means, second spring means of greater strength than the first disposed upon the opposite side of said supporting means for opposing the action of the first spring means, one of said springs being operative for urging the valve member to its open position and the other spring means being operative for urging the valve member to its closed position, means movable on said stem for releasably transmitting the force of the second spring means through said stem to said valve member, relative movement of the movable means on the valve stem operating to apply and release the force of the second spring for opening and closing the poppet valve member in cooperation with the first spring means, bleed means through said poppet valve member closed when said valve member is held in its closed position by said second spring means, said movable means being accessible through said outlet end of said bore for manipulation.

15. In an excess flow valve for use in a liquefied gas system, a body member defining a bore therethrough having an inlet end for communication with a source of liquefied gas under pressure and an outlet end for discharge flow, said body bore defining a transverse spider wall intermediate its ends, a valve stem axially slidably carried within said bore by said spider wall and terminating at its one end in a poppet valve adapted to close the bore inlet end, biasing means urging said poppet valve toward an open flow position, said valve stem having a bore extending axially therethrough, and keeper means including a retainer and a connector, said retainer having means at one end for slidably and non-rotatably engaging said valve stem and an element engaging said spider wall at the other end, said connector serving to removably interconnect said retainer and said valve stem and extending into said valve stem bore for closure thereof.

16. In an excess flow valve for use in a liquefied gas system, a body member defining a bore therethrough having an inlet end for communication with a source of liquefied gas under pressure and an outlet end for discharge flow, said body bore defining a transverse spider wall intermediate its ends having a plurality of flow ports extending therethrough, a valve stem axially slidably carried within said bore by said spider wall and terminating at its one end in a poppet valve adapted to close the bore inlet end, biasing means urging said poppet valve toward an open flow position, said valve stem providing a flat-sided head at its other end, said valve stem having a bore extending axially therethrough, and keeper means including a retainer and a connector, said retainer having a transverse portion slidably and non-rotatably engaging opposite flat sides of said valve stem head and a wing portion projecting therefrom and terminating in a portion extending into a flow port of said spider wall, said connector serving to removably interconnect said retainer and said valve stem and extending into said valve stem bore for closure thereof.

17. In an excess flow valve for use in a liquefied gas system, a body member defining a bore therethrough, having an inlet end for communication with a source of liquefied gas under pressure and an outlet end for discharge flow, said body defining an abutment intermediate its ends, a valve stem axially slidably carried by said body within said bore and terminating at its one end in a valve adapted to close the bore inlet end, biasing means urging said valve toward an open flow position, said valve stem having a bore extending axially therethrough, releasable keeper means including a retainer and a connector for holding the valve closed against the bias of the biasing means, said retainer having means axially engaging said abutment to limit inward movement of said retainer, said retainer further having spaced-portions defining surfaces slidably and non-rotatably engaging said valve stem, said connector serving to removably interconnect said retainer and said valve stem and extending into said valve stem bore for closure thereof.

18. An excess flow check valve comprising a pipe, a retainer threadedly secured in said pipe and defining a valve seat, said retainer defining openings to permit flow of liquid therethrough, a valve adapted to seat on said valve seat having a valve stem secured thereto, a guide on said retainer slidably receiving said valve stem, means biasing said valve and valve stem away from said valve seat, said valve being closable in response to vapor pressure present in said pipe on the valve side of the valve seat, spring means bearing against said retainer at one end, means removably secured on said stem *through said pipe* for receiving the thrust of the other end of said spring means, said spring means when engaged by said removable means urging said valve into closing relationship with said valve seat and having a force at least sufficient to overcome the force of said valve biasing means, and means interconnecting said valve stem and retainer for limiting the distance the valve is opened by said biasing means.

19. In an excess flow check valve, a pipe, a retainer threadedly secured in said pipe and defining a valve seat, said retainer defining openings to permit flow of liquid therethrough, a valve adapted to seat on said valve seat having a valve stem secured thereto *extending through said valve seat,* a guide on said retainer slidably receiving said valve stem, means biasing said valve and valve stem away from said valve seat *and retainer,* said valve being closable in response to vapor pressure present in the pipe on the valve side of the valve seat, spring means bearing against said retainer at one end, means movably secured on said stem for receiving the thrust of the other end of said spring means, said spring means biasing said valve into closing relationship with said valve seat and having a force at least sufficient to overcome the force of said biasing means, and bleed means in said valve stem closed by said movable means.

20. In an excess flow check valve for a liquefied petroleum gas system, a pipe, a retainer threadedly secured in said pipe and defining a valve seat, said retainer defining openings to permit flow of liquid therethrough, a valve stem, a valve adapted to seat on said valve seat carried by said valve stem, a guide on said retainer slidably receiving said valve stem, means biasing said valve and valve stem away from said valve seat, said valve being closable in the direction of flow through said pipe, spring means bearing against said retainer at one end, screw means removably secured in said valve stem for receiving the thrust of the other end of said spring means, said spring means biasing said valve into closing relationship with said valve seat and having a force at least sufficient to overcome the force of said biasing means, and bleed means including a passage in said valve stem extending through said valve and closed by said screw means when secured in said valve stem, said screw means being threadedly received in said passage.

21. An excess flow check valve comprising a pipe, a retainer threadedly secured in said pipe having a spider disposed in the passage defined by said pipe and defining a plurality of radially spaced apertures, a valve stem, a valve seat in said pipe, a valve carried by said valve stem and adapted to seat on said valve seat, a guide on said retainer sliably receiving said valve stem, means biasing said valve and valve stem away from said valve seat, said valve being closable in the direction of flow of liquefied petroleum gas through said pipe, screw means removably secured in said valve stem, spring means bearing against said retainer at one end and against said screw means at the other end, said spring means biasing said valve into closing relationship with said valve seat and having a force at least sufficient to overcome the force of said biasing means, said valve stem defining an axial bleed passage and said screw means being threadedly received in said bleed passage to close it, and a latching prong carried on said valve stem extending into engagement in one of said apertures to prevent angular rotation of said valve and valve stem during removal of said screw means.

22. In an excess flow check valve for use in a system handling liquid under pressure, a housing having a conduit portion terminating at one end in a valve seat and an opening at the other end, valve means adapted to close against said valve seat including a stem extending through said valve seat and slidably mounted in said housing for movement in a longitudinal direction and a valve member carried on said stem adapted to close against said valve seat in a direction towards said opening, first resilient means for urging said valve means with a predetermined force in a direction away from said valve seat, means for limiting the distance of travel of the valve member away from said valve seat, retainer means accessible through said opening and engaging said stem for relative longitudinal movement, second resilient means between said housing and the retainer means of greater force than the first ressilient means normally urging said valve means towards said valve seat, said relative movement of said retainer and stem a predetermined distance releasing said stem from the greater force of the second resilient means to permit the first resilient means to move the valve member away from the valve seat, and said second resilient means when its greater force is applied to the stem yielding to permit said valve member to move away from said valve seat upon inward pressure being applied through said opening against said valve means.

23. In an excess flow check valve for use in a system handling liquid under pressure, a housing having a conduit portion terminating at one end in a valve seat, a threaded opening at the other end and an internally bored guide element in said conduit portion having openings therethrough adjacent to said valve seat, valve means adapted to close against said valve seat including a stem extending through said valve seat and slidably mounted in said bore for movement in a longitudinal direction and a valve member carried on said stem to close against said valve seat in a direction towards said threaded opening, first resilient means in said housing [engaging] *interengaging* said valve [means] *member and said guide element* for urging the valve means with a predetermined force in a direction away from said valve seat, means between said valve means and the housing for limiting the distance of travel of the valve member away from said valve seat, means accessible through [said] said threaded opening for holding said valve member in closed position against the force of said biasing means including a retainer member engaging said stem for relative movement with respect thereto in a longitudinal direction and a second resilient means between said housing and the retainer member of greater force than the first resilient means normally urging said valve means towards said valve seat, movement of the retainer member in one direction a predetermined distance releasing said stem from the greater force of the second resilient means to permit the first resilient means to move the valve member away from the valve seat, said second resilient means yielding to permit the valve member to move away from the valve seat upon inward pressure being selectively applied through said opening against said stem and valve member respectively.

24. An excess flow check valve comprising a housing having a conduit portion terminating at one end in a valve seat, a spider adjacent said valve seat *within said conduit portion and* having a central portion with a longitudinal bore therethrough, a valve member closing against said valve seat, a valve stem slidably received in said bore and extending through said valve seat and valve member, means interconnecting said valve stem and valve member for closing said valve member by movement of said valve stem, resilient means between said valve member and spider for urging the valve member away from the valve seat, means interconnecting said valve stem and spider for limiting opening movement of the valve member under the force of said first resilient means, and [releasable] means *releasably* secured to said valve stem and engaging said spider element for holding said valve member in closed position against the force of the resilient means and yieldable to permit opening of the valve member upon inward pressure being applied to the valve stem side of said valve member, said releasable means being exposed to access through the other end of the conduit *portion*.

25. An excess flow check valve comprising a conduit element defining a fluid flow passageway and having a valve seat adjacent one end of the passageway, a spider in said passageway spaced from said valve seat and having a guide opening therethrough, valve means in said passageway including a valve stem slidably carried in said guide opening and extending through said valve seat at one end and a valve element carried on said valve stem adjacent to said one end adapted to close against said valve seat, means biasing said valve element away from said valve seat, means disposed in the path of flow of fluid through said passageway and accessible through an open end of said conduit for holding said valve element in closed position against the force of said biasing means and for releasing said biasing means selectively including relatively adjustable elements one of which is a part of said valve stem and is engaged by another for drawing said valve element to said closed position, fixed means on said valve stem for limiting the distance said valve element opens and a bleed passage through said valve means.

26. The combination called for in claim 25 in which said adjustable elements include an element supported against rotation in said conduit and engaging said valve stem in slidable non-rotatable relationship.

27. The combination called for in claim 25 in which said valve means, biasing means and holding means are carried solely by said conduit element.

28. In an excess flow check valve, a pipe, a retainer threadedly secured in said pipe and defining a guide and a valve seat, valve means including a valve element adapted to seat on said valve seat and a valve stem carrying said valve element and extending through said valve seat and guide, said valve means being provided with an elongated bleed passage therethrough, said retainer defining openings around said guide to permit flow of liquid therethrough, means *interengaging said guide and valve element* biasing said valve element away from said valve seat, and means including an element adjustably carried by said valve stem for closing the bleed passage and selectively biasing said valve stem and valve element toward said valve seat into closing position, *an element on said valve stem engaging said guide for limiting the distance the valve element opens.*

29. An excess flow check valve comprising a pipe, a retainer threadedly secured in said pipe and defining a valve seat, said retainer defining openings to permit flow of liquid therethrough, a valve adapted to seat on said valve seat having a valve stem secured thereto *extending through said valve seat,* a guide on said retainer slidably receiving said valve stem, means *engaging said valve for* biasing said valve and valve stem away from said valve seat, stop means *on said valve stem* for limiting the opening movement of said valve, said valve being closable in response to pressure in the pipe on the valve side of the valve seat, spring means bearing against said retainer at one end, bleed means through said valve, and means *accessible through one end of the pipe* movably secured on said stem for closing said bleed means and receiving the thrust of the other end of said spring means, said spring means urging said valve into closing relationship with said valve seat and having a force at least sufficient to overcome the force of said biasing means.

30. An excess flow check valve comprising a housing having a conduit portion terminating at one end in a valve seat, a spider element adjacent said valve seat having a central portion with a longitudinal bore therethrough, a valve member closing against said valve seat, a valve stem slidably received in said bore and extending through said valve seat and valve member, means interconnecting said valve stem and valve member for closing said valve member by movement of said valve stem, resilient means between said valve member and spider for urging the valve member away from the valve seat, means interengaging said valve stem and spider element for limiting opening movement of said valve member away from said valve seat, and releasable means secured to said valve stem and engaging said spider element for holding said valve member in closed position against the force of the resilient means yieldable to permit opening of the valve member upon pressure being applied against the valve member upon the valve stem side thereof, said releasable means being exposed to access through the other end of the conduit *portion*.

References Cited in the file of this patent or the original patent

UNITED STATES PATENTS

| | | |
|---|---|---|
| 337,236 | Briscoe | Mar. 2, 1886 |
| 490,955 | Fishburn | Jan. 31, 1893 |
| 744,625 | Sarver | Nov. 17, 1903 |

(Other references on following page)

UNITED STATES PATENTS

| | | |
|---|---|---|
| 1,125,979 | Dieter | Jan. 26, 1915 |
| 1,196,861 | Hayes | Sept. 5, 1916 |
| 1,292,229 | Baker | Jan. 21, 1919 |
| 2,367,662 | Baxter | Jan. 23, 1945 |
| 2,404,924 | Sacchini | July 30, 1946 |
| 2,511,494 | Cohen | June 13, 1950 |

| | | |
|---|---|---|
| 2,522,406 | Smith | Sept. 12, 1950 |
| 2,834,377 | Bragg | May 13, 1958 |
| 2,886,054 | Smith | May 12, 1959 |
| 2,886,061 | Smith | May 12, 1959 |

FOREIGN PATENTS

| | | |
|---|---|---|
| 500,420 | Great Britain | Feb. 8, 1939 |